United States Patent
Kim et al.

(10) Patent No.: US 11,472,968 B2
(45) Date of Patent: Oct. 18, 2022

(54) COLOR SHIFTING FILM, AND BACKLIGHT UNIT AND DISPLAY DEVICE COMPRISING SAME

(71) Applicant: LG CHEM, LTD., Seoul (KR)

(72) Inventors: Ji Ho Kim, Daejeon (KR); Dong Mok Shin, Daejeon (KR); Nari Kim, Daejeon (KR); Hye Mi Oh, Daejeon (KR); Sung Yong Min, Daejeon (KR)

(73) Assignee: LG CHEM, LTD., Seoul (KR)

( * ) Notice: Subject to any disclaimer, the term of this patent is extended or adjusted under 35 U.S.C. 154(b) by 331 days.

(21) Appl. No.: 16/633,794

(22) PCT Filed: Jan. 11, 2019

(86) PCT No.: PCT/KR2019/000471
§ 371 (c)(1),
(2) Date: Jan. 24, 2020

(87) PCT Pub. No.: WO2019/146941
PCT Pub. Date: Aug. 1, 2019

(65) Prior Publication Data
US 2021/0371676 A1  Dec. 2, 2021

(30) Foreign Application Priority Data

Jan. 23, 2018  (KR) .................. 10-2018-0008219

(51) Int. Cl.
| | | |
|---|---|---|
| *C09D 5/22* | (2006.01) | |
| *C09D 7/20* | (2018.01) | |
| *C09D 7/41* | (2018.01) | |
| *C09D 125/12* | (2006.01) | |
| *C09D 133/20* | (2006.01) | |

(Continued)

(52) U.S. Cl.
CPC .............. *C09D 5/22* (2013.01); *C09D 7/20* (2018.01); *C09D 7/41* (2018.01); *C09D 125/12* (2013.01); *C09D 133/20* (2013.01); *C09K 11/06* (2013.01); *C09K 2211/1018* (2013.01); *G02B 6/0055* (2013.01)

(58) Field of Classification Search
CPC ... C09D 5/22; C09D 7/20; C09D 7/41; C09D 125/12; C09D 133/20; C09K 11/06; C09K 2211/1018; G02B 6/0055
See application file for complete search history.

(56) References Cited

U.S. PATENT DOCUMENTS

| | | |
|---|---|---|
| 6,337,536 B1 | 1/2002 | Matsubara et al. |
| 10,703,970 B2 | 7/2020 | Umehara et al. |

(Continued)

FOREIGN PATENT DOCUMENTS

| | | |
|---|---|---|
| CN | 101674923 A | 3/2010 |
| JP | 2016-021056 A | 2/2016 |

(Continued)

OTHER PUBLICATIONS

International Search Report and Written Opinion issued for PCT Application No. PCT/KR2019/000471 dated Apr. 12, 2019, 7 pages.

*Primary Examiner* — Andrew J Coughlin
*Assistant Examiner* — Jessica M Apenteng
(74) *Attorney, Agent, or Firm* — Rothwell, Figg, Ernst & Manbeck, P.C.

(57) ABSTRACT

The present specification relates to a color conversion film, and a backlight unit and a display device, including the same.

14 Claims, 4 Drawing Sheets

(51) Int. Cl.
*C09K 11/06* (2006.01)
*F21V 8/00* (2006.01)

(56) References Cited

U.S. PATENT DOCUMENTS

| | | |
|---|---|---|
| 2002/0132122 A1 | 9/2002 | Marutsuka |
| 2008/0254320 A1* | 10/2008 | Akino ................ C08K 5/0041 |
| | | 428/704 |
| 2010/0187719 A1 | 7/2010 | Oishi et al. |
| 2012/0113672 A1* | 5/2012 | Dubrow ............... G02B 6/0061 |
| | | 977/774 |
| 2017/0186922 A1 | 6/2017 | Kim et al. |
| 2017/0192146 A1* | 7/2017 | Yamada ............ G02F 1/133602 |
| 2017/0247610 A1* | 8/2017 | Kim ....................... G02B 6/005 |
| 2017/0248748 A1* | 8/2017 | Satake ................... G02B 6/005 |
| 2017/0329179 A1 | 11/2017 | Cho et al. |
| 2017/0373229 A1 | 12/2017 | Shin et al. |
| 2018/0203302 A1 | 7/2018 | Kim |
| 2019/0093008 A1 | 3/2019 | Shin et al. |

FOREIGN PATENT DOCUMENTS

| | | |
|---|---|---|
| JP | 2016-066041 A | 4/2016 |
| KR | 10-2000-0011622 A | 2/2000 |
| KR | 10-2014-0143060 A | 12/2014 |
| KR | 10-2016-0050933 A | 5/2016 |
| KR | 10-2016-0094887 A | 8/2016 |
| KR | 10-2017-0008171 A | 1/2017 |
| KR | 10-2017-0078553 A | 7/2017 |
| TW | 200603973 A | 2/2006 |
| WO | 2017-002707 A1 | 1/2017 |
| WO | 2017-183854 A1 | 10/2017 |

\* cited by examiner

[Figure 1]
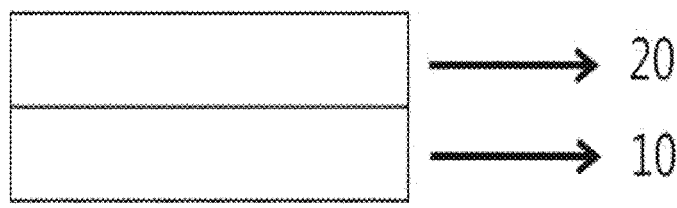
[Figure 2]
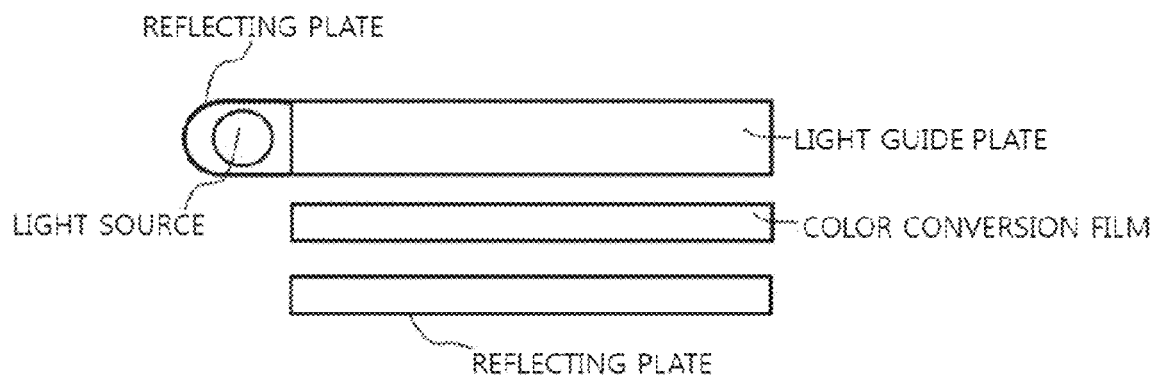
[Figure 3]
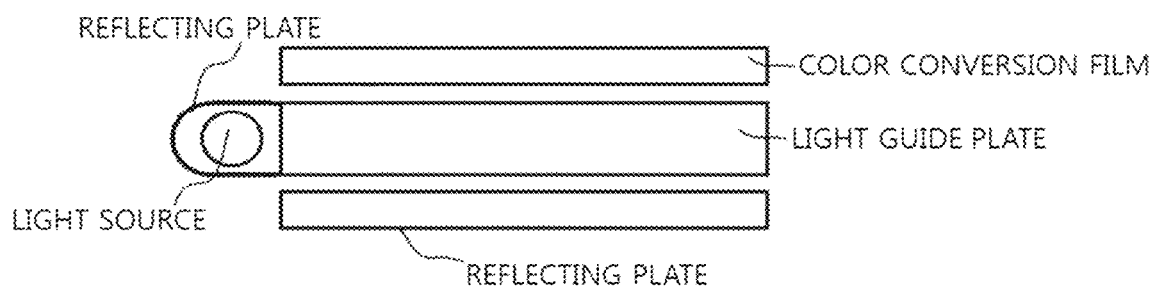

[Figure 4]
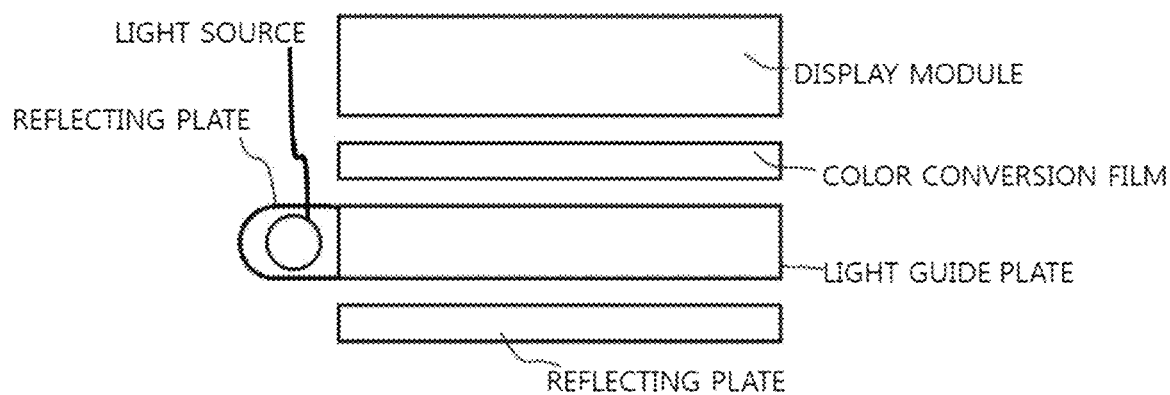
[Figure 5]
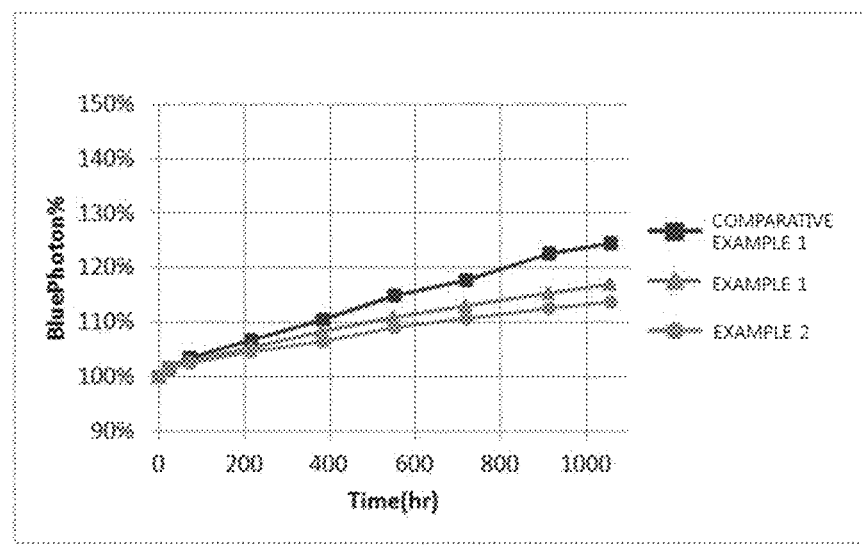

[Figure 6]
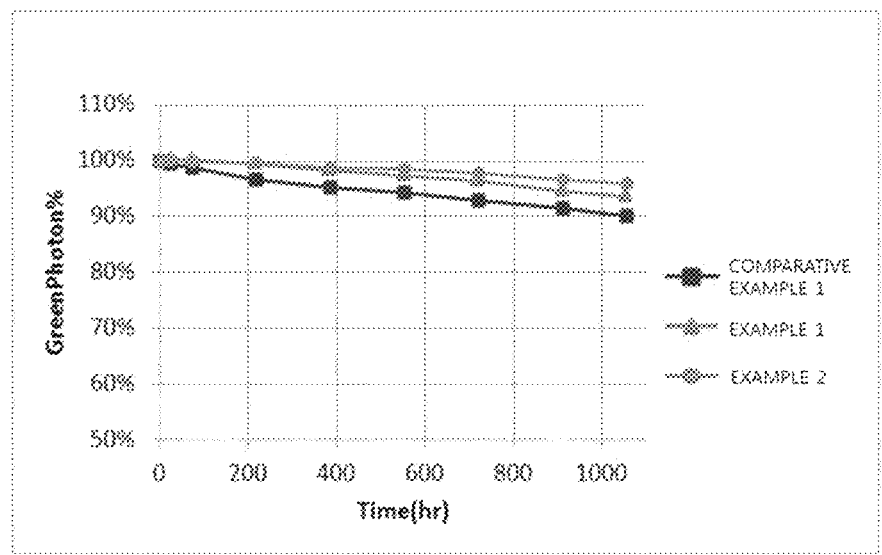
[Figure 7]
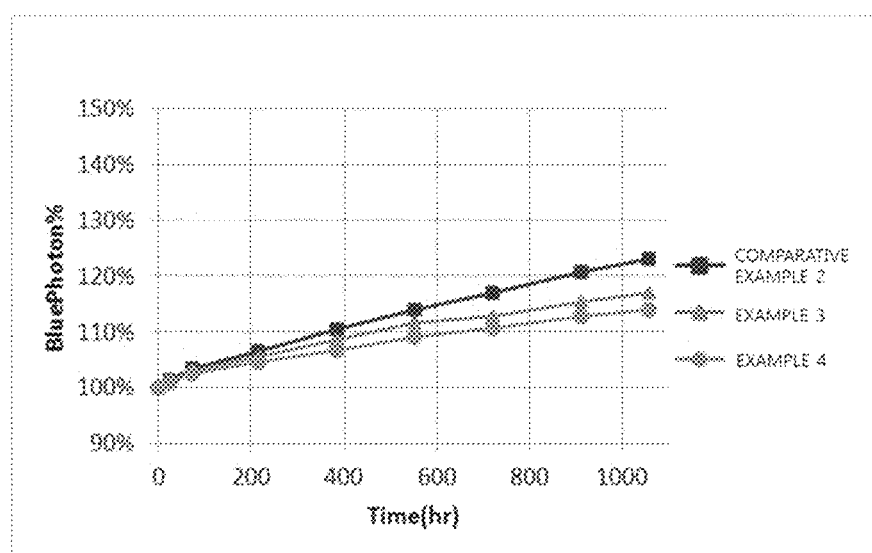

[Figure 8]
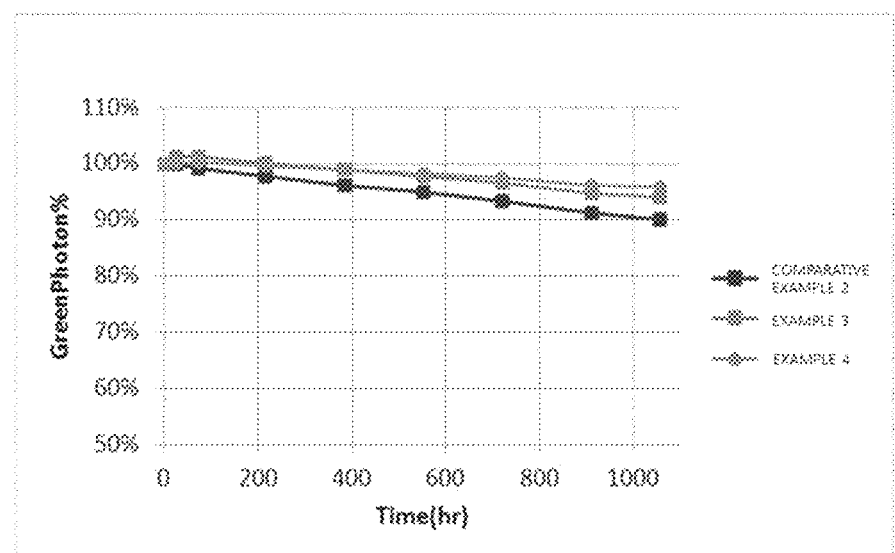

COLOR SHIFTING FILM, AND BACKLIGHT UNIT AND DISPLAY DEVICE COMPRISING SAME

This application is a 35 U.S.C. § 371 National Phase Entry Application from PCT/KR2019/000471, filed on Jan. 11, 2019, and designating the United States, which claims priority to and the benefit of Korean Patent Application No. 10-2018-0008219 filed in the Korean Intellectual Property Office on Jan. 23, 2018, the entire contents of which are incorporated herein by reference.

TECHNICAL FIELD

The present specification relates to a color conversion film, and a backlight unit and a display device, including the same.

BACKGROUND ART

In the case of an organic fluorescent dye, studies have been continuously conducted as a light emitting material for a display due to the advantages such as various light emission wavelengths and improvement in manufacturing costs.

In general, a color conversion film is manufactured by dissolving an organic fluorescent dye and a binder in an organic solvent, coating the resulting solution, and drying the solution in order to apply the organic fluorescent dye to a display. However, the color conversion film manufactured as described above has a problem in that there occurs a phenomenon in which a color fades due to deterioration in durability of the film caused by a photobleaching phenomenon when the color conversion film is driven at a backlight light source of a TV.

The photobleaching phenomenon is a phenomenon occurring when an organic fluorescent dye is brought into contact with oxygen and moisture, and occurs when there is a remaining solvent in a binder after a color conversion film is subjected to coating and drying processes.

Therefore, there is a need for studies on a color conversion film with a small amount of solvent remaining in order to prevent the photobleaching phenomenon.

BRIEF DESCRIPTION OF INVENTION

The present specification provides a color conversion film, and a backlight unit and a display device, including the same.

An exemplary embodiment of the present specification provides a color conversion film including: a base film; and a color conversion layer provided on the base film, in which the color conversion layer includes: a thermoplastic resin; a solvent; and an organic fluorescent dye dispersed in the thermoplastic resin, and a content of the solvent is 0.0001 part by weight to 0.1 part by weight based on 100 parts by weight of the color conversion layer.

Another exemplary embodiment of the present specification provides a method for manufacturing a color conversion film, the method including:

preparing a base film;
preparing a resin solution in which a thermoplastic resin, a solvent, and an organic fluorescent dye are mixed;
coating the resin solution onto the base film;
primary drying the resin solution coated onto the base film; and
further secondary drying the resin solution after primary drying of the resin solution coated onto the base film, in which a content of the solvent after the secondary drying is 0.0001 part by weight to 0.1 part by weight based on 100 parts by weight of the color conversion layer.

Still another exemplary embodiment of the present specification provides a backlight unit including the above-described color conversion film.

Yet another exemplary embodiment of the present specification provides a display device including the above-described backlight unit.

Advantageous Effects

A color conversion film according to an exemplary embodiment of the present specification may secure durability of an organic fluorescent dye in the color conversion film by optimizing the numerical value of the remaining solvent contained in a color conversion layer.

BRIEF DESCRIPTION OF DRAWINGS

FIG. 1 is a schematic view of a color conversion film according to an exemplary embodiment of the present specification.

FIGS. 2 and 3 are schematic views exemplifying a structure of a backlight unit according to an exemplary embodiment of the present specification.

FIG. 4 is a schematic view exemplifying a structure of a display device according to an exemplary embodiment of the present specification.

FIGS. 5 and 7 illustrate the amounts of change in blue photon of the color conversion film according to an exemplary embodiment of the present specification.

FIGS. 6 and 8 illustrate the amounts of change in green photon of the color conversion film according to an exemplary embodiment of the present specification.

10: Base film
20: Color conversion layer

DETAILED DESCRIPTION OF INVENTION

Hereinafter, the present specification will be described in more detail.

When one member is disposed "on" another member in the present specification, this includes not only a case where the one member is brought into contact with another member, but also a case where still another member is present between the two members.

When one part "includes" one constituent element in the present specification, unless otherwise specifically described, this does not mean that another constituent element is excluded, but means that another constituent element may be further included.

An exemplary embodiment of the present specification provides a color conversion film including: a base film; and a color conversion layer provided on the base film, in which the color conversion layer includes: a thermoplastic resin; a solvent; and an organic fluorescent dye dispersed in the thermoplastic resin, and a content of the solvent is 0.0001 part by weight to 0.1 part by weight based on 100 parts by weight of the color conversion layer.

When the content of the solvent satisfies a range of 0.0001 part by weight to 0.1 part by weight based on 100 parts by weight of the color conversion layer, the durability of an organic fluorescent dye contained in the color conversion film may be improved as compared to a case where the content is out of the above range.

Further, the durability of the organic fluorescent dye is improved, so that when the color conversion film is applied to a display device, there is an effect in that a decrease in amount of light emission as compared to the initial stage is reduced.

FIG. 1 illustrates a color conversion film according to an exemplary embodiment of the present specification. Specifically, FIG. 1 illustrates a color conversion film coated with a color conversion layer 20 on a base film 10.

In an exemplary embodiment of the present specification, the thermoplastic resin may be styrene acrylonitrile, poly (methylmethacrylate), polycarbonate, polystyrene, or a combination thereof. Specifically, for the thermoplastic resin, the above-described resins may be used either alone or in mixture of two thereof.

In an exemplary embodiment of the present specification, the thermoplastic resin exhibits transparent characteristics. Here, transparency means that the transmittance of visible light is 75% or more.

In an exemplary embodiment of the present specification, the solvent may be dimethylformamide, N,N-dimethylacetamide, pyridine, 2-methylpyridine, 4-methylpyridine, butyl acetate, n-propyl acetate, ethyl acetate, xylene, toluene, cyclohexanone, methyl ethyl ketone, methyl isobutyl ketone, or a combination thereof. Specifically, for the solvent, the above-described solvents may be used either alone or in mixture of two thereof.

In an exemplary embodiment of the present specification, as the organic fluorescence dye, it is possible to use dyes absorbing light selected in a region from near-ultraviolet to visible, and emitting light having a wavelength different from that of the absorbed light.

In an exemplary embodiment of the present specification, the organic fluorescent dye includes one or more of BODIPY-based, acridine-based, xanthene-based, arylmethane-based, coumarin-based, polycyclic aromatic hydrocarbon-based, polycyclic heteroaromatic-based, perylene-based, pyrrole-based, and pyrene-based derivatives. Specifically, the organic fluorescent dye includes one or two of the above-described materials. More specifically, as the organic fluorescent dye, a BODIPY-based organic fluorescent dye is used.

In an exemplary embodiment of the present specification, the organic fluorescent dye includes a green light emitting fluorescent dye having a maximum light emission wavelength present between 500 nm and 550 nm, a red light emitting fluorescent dye having a maximum light emission wavelength present between 600 nm and 660 nm, or a combination thereof, the green light emitting fluorescent dye has a full width at half maximum of 70 nm or less, and the red light emitting fluorescent dye has a full width at half maximum of 90 nm or less.

In the present specification, "the green light emitting fluorescent dye" absorbs at least a part of blue light to emit green light, and "the red light emitting fluorescent dye" absorbs at least a part of blue light or green light to emit red light. For example, the red light emitting fluorescent dye may absorb not only blue light but also light having a wavelength of 500 nm to 600 nm.

In the present specification, for the blue light, the green light, and the red light, the definitions known in the art may be used, and for example, the blue light is a light having a wavelength selected from a wavelength of 400 nm to 500 nm, the green light is a light having a wavelength selected from a wavelength of 500 nm to 560 nm, and the red light is a light having a wavelength selected from a wavelength of 600 nm to 780 nm.

In the present specification, the "full width at half maximum" means, when light is emitted by converting light absorbed from an external light source into a light having a different wavelength, a width of a light emission peak at the half of the maximum height in the maximum light emission peak of the emitted light. In the present specification, the full width at half maximum is measured in a film state. The full width at half maximum of a light emission peak in a film state of an organic fluorescent dye means those measured by irradiating the organic fluorescent dye in a state prepared in a film form instead of a solution state with light by using the organic fluorescent dye alone or mixing with other components that do not affect the measurement of the full width at half maximum.

In an exemplary embodiment of the present specification, a smaller full width at half maximum of the green light emission fluorescent dye is preferred, and the lower limit thereof is not particularly limited, but may be, for example, 15 nm or more.

In an exemplary embodiment of the present specification, a smaller full width at half maximum of the red light emission fluorescent dye is preferred, and the lower limit thereof is not particularly limited, but may be, for example, 20 nm or more.

In an exemplary embodiment of the present specification, the organic fluorescent dye has a molecular absorption coefficient of 50,000 $M^{-1}cm^{-1}$ to 150,000 $M^{-1}cm^{-1}$.

In an exemplary embodiment of the present specification, the base film has a thickness of 1 μm to 100 μm. More specifically, the base film may have a thickness of 10 μm to 90 μm, preferably 20 μm to 80 μm.

In an exemplary embodiment of the present specification, the organic fluorescent dye is present in the form of being dispersed in a thermoplastic resin.

The content of the organic fluorescent dye is 0.005 part by weight to 2 parts by weight based on 100 parts by weight of a thermoplastic resin.

In an exemplary embodiment of the present specification, the color conversion film according to the above-described exemplary embodiment additionally includes a light diffusion particle. By dispersing light diffusion particles in the color conversion film instead of a light diffusion film used in the related art in order to improve brightness, an attaching process may be omitted, and higher brightness may be exhibited as compared to the case where a separate light diffusion film is used.

As the light diffusion particle, a particle having a higher refractive index than that of a thermoplastic resin may be used, and the light diffusion particle includes, for example, $TiO_2$; silica; borosilicate; alumina; sapphire; air- or gas-filled hollow beads or particles (for example, air/gas-filled glass or polymer); polymer particles including polystyrene, polycarbonate, polymethylmethacrylate, acryl, methyl methacrylate, styrene, a melamine resin, a formaldehyde resin, or a melamine and formaldehyde resin; or a combination thereof.

The light diffusion particles may have a particle diameter of 0.1 μm to 5 μm. The content of the light diffusion particles may be determined, if necessary, and may be, for example, about 1 part by weight to about 30 parts by weight based on 100 parts by weight of the thermoplastic resin solid content.

In an exemplary embodiment of the present specification, the color conversion film has a thickness of 2 μm to 200 μm.

In an exemplary embodiment of the present specification, the color conversion film may exhibit high brightness even with a small thickness of 2 μm to 20 μm. This is because the content of fluorescent substance molecules included in a unit volume is higher than that of quantum dots. For example, a 5 μm-thick color conversion film to which a 0.5 wt % content of the organic fluorescent dye as compared to the resin solid content is applied may show a high brightness of 4,000 nit or more based on a brightness of 600 nit of a blue backlight unit (blue BLU).

In an exemplary embodiment of the present specification, a color conversion film includes: a base film; and a color conversion layer provided on the base film.

In an exemplary embodiment of the present specification, the base film may function as a support during the manufacture of the color conversion film. As the base film, those known in the art may be used without being limited to the type or thickness thereof as long as the base film is transparent and may function as a support. Here, transparency means that the transmittance of visible light is 70% or more. For example, as the base film, a PET film may be used. If necessary, the base film may be replaced with a barrier film.

As the barrier film, those known in the art may be used without particular limitation as long as the barrier film is a film capable of blocking moisture or oxygen. For example, the barrier film includes a barrier layer having a transmittance of at least one of moisture and oxygen of $10^{-1}$ $cc/m^2/day$ or less. For example, the barrier layer may include aluminum oxide or nitride, and ionic metal oxide imparting a moisture or oxygen blocking property. The barrier film may further include a buffer layer formed with one or more selected from sol-gel-based, acrylic, epoxy-based and urethane-based coating solution compositions as a buffer layer.

As an example, the barrier film may include an organic-inorganic hybrid coating layer, an inorganic material layer and a protective coating layer including inorganic nanoparticles of which surfaces are modified with organosilane provided on one or both surfaces of a base film. Herein, the inorganic material layer may be formed with metal oxides or nitrides. The inorganic nanoparticles may be nanoparticles of alumina, silica, zinc oxide, antimony oxide, titanium oxide or zirconium oxide. The organic-inorganic hybrid coating layer may be formed by curing a coating composition in a sol state including organosilane using heat or UV, and the coating solution composition in a sol state may include, together with the organosilane, proper additives, solvents, polymerization catalysts and the like in some cases.

In an exemplary embodiment of the present specification, an adhesive or bonding layer may be provided on one surface of the color conversion film. Specifically, an adhesive or bonding layer may be provided on one surface of a color conversion layer which is not provided with a base film. A component constituting the adhesive or bonding layer can be used without limitation as long as the component is a material used in the art.

An exemplary embodiment of the present specification provides a method for manufacturing a color conversion film, the method including:
preparing a base film;
preparing a resin solution in which a thermoplastic resin, a solvent, and an organic fluorescent dye are mixed;
coating the resin solution onto the base film;
primary drying the resin solution coated onto the base film; and
further secondary drying the resin solution after primary drying the resin solution coated onto the base film,
in which a content of the solvent after the secondary drying is 0.0001 part by weight to 0.1 part by weight based on 100 parts by weight of the color conversion layer.

In the above-described color conversion film, the color conversion layer may be manufactured by a method including: coating a resin solution in which a thermoplastic resin, a solvent, and an organic fluorescent dye are dissolved onto a base film; primary drying the resin solution coated onto the base film; and further secondary drying the resin solution after primary drying of the resin solution coated onto the base film, or a method including extruding an organic fluorescent material with a resin.

Since the above-described organic fluorescent dye is dissolved in the resin solution, the organic fluorescent dye is uniformly distributed in the solution. This is different from a process of producing a quantum dot film, which requires a separate dispersing process.

In an exemplary embodiment of the present specification, as for the resin solution in which the organic fluorescent dye is dissolved, the production method thereof is not particularly limited as long as the organic fluorescent dye and the resin described above are dissolved in the solution.

According to an example, the resin solution in which the organic fluorescent dye is dissolved may be produced by using a method of preparing a first solution by dissolving an organic fluorescent dye in a solvent, preparing a second solution by dissolving a thermoplastic resin in a solvent, and mixing the first solution and the second solution. When the first solution and the second solution are mixed, it is preferred to uniformly mix the solutions. However, the method is not limited thereto, and it is possible to use a method of simultaneously adding and dissolving an organic fluorescent dye and a thermoplastic resin in a solvent, a method of dissolving an organic fluorescent dye in a solvent and subsequently adding and dissolving a thermoplastic resin thereto, a method of dissolving a thermoplastic resin in a solvent and subsequently adding and dissolving an organic fluorescent dye thereto, and the like.

The organic fluorescent dye included in the solution is the same as described above.

In an exemplary embodiment of the present specification, it is possible to use a monomer which is curable by a thermoplastic resin instead of the thermoplastic resin included in the solution, or a mixture of a thermoplastic resin and a monomer which is curable by the thermoplastic resin. Examples of the monomer which is curable by the thermoplastic resin include a (meth)acrylic monomer, and the monomer may be formed as a resin matrix material by UV curing. When a curable monomer is used as described above, an initiator required for curing may be further added, if necessary.

When the first solution and the second solution are used, the solvents included in each of the solutions may also be the same as or different from each other. Even when different solvents are used in the first solution and the second solution, it is preferred that these solvents have compatibility so as to be mixed with each other.

The type of solvent included in the solution is the same as described above.

In an exemplary embodiment of the present specification, when the monomer which is curable by the thermoplastic resin is used as a resin included in the solution, curing, for example, UV curing may be performed before the drying or simultaneously with the drying.

When the organic fluorescent dye is filmed by being extruded with a resin, an extrusion method known in the art may be used, and for example, a color conversion layer may be manufactured by extruding an organic fluorescent dye with a resin such as a polycarbonate (PC)-based resin, a poly(meth)acrylic resin, and a styrene-acrylonitrile (SAN)-based resin.

In an exemplary embodiment of the present specification, an adhesive or bonding layer may be formed on the color conversion layer manufactured as described above. The adhesive or bonding layer may also be formed by applying a composition for forming an adhesive or bonding layer, and then polymerizing or curing the composition, and may also be formed by a method of attaching an adhesive or bonding sheet on the color conversion layer. The adhesive or bonding sheet may also be polymerized or cured after being attached to the color conversion layer, but may also be polymerized or cured before being attached to the color conversion layer, if necessary. As the curing, a UV curing may be used. The curing conditions may be determined according to the component and composition ratio of the composition.

In an exemplary embodiment of the present specification, light diffusion particles may be dispersed in the composition for forming an adhesive or bonding layer to disperse the light diffusion particles in an adhesive or bonding layer. In this case, light diffusion particles may also be directly dispersed in a composition for forming an adhesive or bonding layer, and the dispersity of light diffusion particles may be increased by mixing a dispersion, in which the light diffusion particles are dispersed in a separate solvent, with the composition for forming an adhesive or bonding layer. If necessary, a sonicator or a shaker may be used in order to disperse light diffusion particles in a solvent.

In an exemplary embodiment of the present specification, the coating of the resin solution onto the base film is performed by a roll-to-roll process. For example, the process may be performed by a process of unwinding a base material from a roll on which the base film is wound, coating a resin solution, in which the organic fluorescent dye is dissolved, onto one surface of the base film, drying the resin solution, and then winding the base film again on the roll. When the roll-to-roll process is used, it is preferred that the viscosity of the resin solution is determined within a range in which the process may be implemented, and for example, the viscosity of the resin solution may be 200 cps to 2,000 cps.

As the method of coating the resin solution in which the organic fluorescent dye is dissolved onto one surface of the base film, various publicly-known methods may be used, and for example, a die coater may also be used, and various bar-coating methods such as a comma coater and a reverse comma coater may also be used.

In an exemplary embodiment of the present specification, the primary drying of the resin solution coated onto the base film is performed at 100° C. to 200° C. for 15 minutes or less. For example, it is possible to obtain a color conversion layer having an appropriate thickness, which includes a fluorescent substance having a desired concentration on a base film by drying the base film in an oven located close to a coater in a direction of the base film progressing during the coating process. The primary drying of the resin solution may be performed at a temperature within a range of more specifically 130° C. to 180° C. for 10 minutes to 15 minutes.

In an exemplary embodiment of the present specification, the further secondary drying of the resin solution after the primary drying of the resin solution coated onto the base film is performed at 130° C. to 200° C. for 25 minutes or less. More specifically, the secondary drying may be performed at a temperature within a range of 150° C. to 200° C. for 10 minutes to 20 minutes.

The numerical value of the solvent remaining in the color conversion layer may be optimized by subjecting the resin solution to the further secondary drying step. That is, the content of the remaining solvent may satisfy 0.0001 part by weight to 0.1 part by weight based on 100 parts by weight of the color conversion layer.

An exemplary embodiment of the present specification has an effect of alleviating production of thermal wrinkles of a film, which is a problem that may occur when the primary drying is performed for a long period of time by performing the secondary drying rather than performing the primary drying for a long period of time.

Another exemplary embodiment of the present specification provides a backlight unit including the above-described color conversion film. The backlight unit may have a backlight unit configuration known in the art, except that the backlight unit includes the color conversion film.

FIGS. 2 and 3 exemplify a structure of a backlight unit according to an exemplary embodiment of the present specification. According to FIG. 2, the color conversion film according to the above-described exemplary embodiments is provided between a light guide plate and a reflecting plate. According to FIG. 3, the color conversion film according to the above-described exemplary embodiments is provided on a surface opposite to a surface of a light guide plate facing a reflecting plate. FIGS. 2 and 3 exemplify a configuration including a light source and a reflecting plate surrounding the light source, but the configuration is not limited to such a structure, and may be modified depending on the structure of the backlight unit known in the art. Furthermore, as the light source, not only side-chain type, but also direct type may be used, and a reflecting plate or a reflecting layer may be omitted or replaced with another configuration, if necessary.

Still another exemplary embodiment of the present specification provides a display device including the above-described backlight unit. For example, the display device includes a display module and a backlight unit. FIG. 4 exemplifies a structure of a display device according to an exemplary embodiment of the present specification. According to FIG. 4, the color conversion film according to the above-described exemplary embodiments is provided on a surface opposite to a surface of a light guide plate facing a reflecting plate, and a display module is provided at the upper portion of the color conversion film. However, a structure of a display device is not limited thereto, and the structure of the display device is not particularly limited as long as the display device includes the above-described backlight unit as a constituent element. If necessary, an additional film, for example, a light diffusion film, a light collecting film, a brightness enhancement film, and the like may be further provided between a display module and a backlight unit.

The display device is not particularly limited, and may be, for example, a TV, a monitor of a computer, a laptop, and a mobile phone.

MODE FOR INVENTION

Hereinafter, the present specification will be described in detail with reference to Examples for specifically describing the present specification. However, the Examples according to the present specification may be modified in various forms, and it is not interpreted that the scope of the present application is limited to the Examples described in detail below. The Examples of the present application are provided for more completely explaining the present specification to the person with ordinary skill in the art.

Example 1

A first solution was produced by dissolving a green fluorescent substance having the following structural formula in butyl acetate.

<Green Fluorescent Substance>

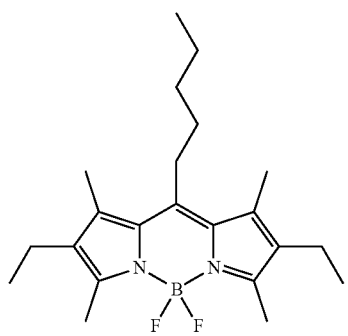

A second solution was produced by dissolving styrene acrylonitrile in butyl acetate. The first solution and the second solution were uniformly mixed such that the content of the green fluorescent substance was 0.45 part by weight and the content of $TiO_2$ particles was 10 parts by weight based on 100 parts by weight of the styrene acrylonitrile. A color conversion film was manufactured by coating the solution onto a PET base film having a thickness of 50 μm, primary drying the solution at 150° C. for 15 minutes, and then secondary drying the solution at 150° C. for 15 minutes.

Example 2

A color conversion film was manufactured in the same manner as in Example 1, except that in Example 1, the secondary drying was performed at 150° C. for 20 minutes.

Comparative Example 1

A color conversion film was manufactured in the same manner as in Example 1, except that in Example 1, the secondary drying was not performed.

Example 3

A color conversion film was manufactured in the same manner as in Example 1, except that in Example 1, dimethylformamide (DMF) was used instead of butyl acetate as the solvent.

Example 4

A color conversion film was manufactured in the same manner as in Example 2, except that in Example 2, dimethylformamide (DMF) was used instead of butyl acetate as the solvent.

Comparative Example 2

A color conversion film was manufactured in the same manner as in Example 3, except that in Example 3, the secondary drying was not performed.

Experimental Example 1. Measurement of Amount of Solvent Remaining

The amounts of solvent remaining of the color conversion films manufactured in Examples 1 to 4 and Comparative Examples 1 and 2 were measured, and are shown in Tables 1 and 2.

As the amount of solvent remaining, an amount detected was measured by heating 0.5 g of the color conversion film at 150° C. for 60 minutes using a chromatography apparatus.

TABLE 1

|  | Example 1 | Example 2 | Comparative Example 1 |
|---|---|---|---|
| Solvent | Butyl acetate | Butyl acetate | Butyl acetate |
| Further drying | Performed (150° C., 15 minutes) | Performed (150° C., 20 minutes) | Not performed |
| Amount (ppm) of solvent remaining | 800 | 200 | 1,500 |

TABLE 2

|  | Example 3 | Example 4 | Comparative Example 2 |
|---|---|---|---|
| Solvent | DMF | DMF | DMF |
| Further drying | Performed (150° C., 15 minutes) | Performed (150° C., 20 minutes) | Not performed |
| Amount (ppm) of solvent remaining | 700 | 250 | 1,300 |

From Tables 1 and 2, it can be confirmed that the amounts of solvent remaining in Examples 1 to 4 in which the further drying was performed are smaller than those in Comparative Examples 1 and 2 in which the further drying was not performed.

Experimental Example 2. Measurement of Amount of Change in Blue Photon or Green Photon After each of the color conversion films manufactured in Examples 1 to 4 and Comparative Examples 1 and 2 was positioned on a light guide plate of a backlight unit, the amount of change in blue photon or green photon was measured by using a spectroradiometer apparatus.

The amounts of change in blue photon and green photon of the color conversion films manufactured in Examples 1 and 2 and Comparative Example 1 according to the time are illustrated in FIGS. 5 and 6, respectively.

The amounts of change in blue photon and green photon of the color conversion films manufactured in Examples 3 and 4 and Comparative Example 2 according to the time are illustrated in FIGS. 7 and 8, respectively.

In FIGS. 5 to 8, a large change in amount of photon means that the amount of photon emitted from the color conversion film becomes large. As the amount of photon emitted is increased, the amount of photon capable of absorbing the color of a light source in the color conversion film is decreased, and the durability of the color conversion film deteriorates. That is, in FIGS. 5 to 8, a large change in amount of photon means that the durability of the color conversion film deteriorates.

From FIGS. 5 and 6, it can be confirmed that in the case of Comparative Example 1 in which the secondary drying was not performed, the amounts of change in blue photon and green photon are larger than those in Examples 1 and 2. Further, from FIGS. 7 and 8, it can be confirmed that in the case of Comparative Example 2 in which the secondary drying was not performed, the amounts of change in blue photon and green photon are larger than those in Examples 3 and 4. From this fact, it could be confirmed that when the amount of solvent present in the color conversion film satisfied the above-described range, the durability of the film was improved.

The invention claimed is:

1. A color conversion film comprising: a base film; and a color conversion layer on the base film,
wherein the color conversion layer comprises: a thermoplastic resin; a solvent; and an organic fluorescent dye dispersed in the thermoplastic resin, and
a content of the solvent is 0.0001 part by weight to 0.1 part by weight based on 100 parts by weight of the color conversion layer.

2. The color conversion film of claim 1, wherein the thermoplastic resin is styrene acrylonitrile, poly(methylmethacrylate), polycarbonate, polystyrene, or a combination thereof.

3. The color conversion film of claim 1, wherein the solvent is dimethylformamide, N,N-dimethylacetamide, pyridine, 2-methylpyridine, 4-methylpyridine, butyl acetate, n-propyl acetate, ethyl acetate, xylene, toluene, cyclohexanone, methyl ethyl ketone, methyl isobutyl ketone, or a combination thereof.

4. The color conversion film of claim 1, wherein the organic fluorescent dye comprises one or more selected from the group of BODIFY-based, acridine-based, xanthene-based, arylmethane-based, coumarin-based, polycyclic aromatic hydrocarbon-based, polycyclic heteroaromatic-based, perylene-based, pyrrole-based, and pyrene-based derivatives.

5. The color conversion film of claim 1, wherein the organic fluorescent dye comprises a green light emitting fluorescent dye having a maximum light emission wavelength present between 500 nm and 550 nm, a red light emitting fluorescent dye having a maximum light emission wavelength present between 600 nm and 660 nm, or a combination thereof,
the green light emitting fluorescent dye having a full width at half maximum of 70 nm or less, and
the red light emitting fluorescent dye having a full width at half maximum of 90 nm or less.

6. A method for manufacturing a color conversion film, the method comprising:
preparing a base film;
preparing a resin solution comprising a thermoplastic resin, a solvent, and an organic fluorescent dye;
coating the resin solution onto the base film;
performing primary drying of the resin solution coated onto the base film; and
performing secondary drying the resin solution after the primary drying to form a color conversion layer,
wherein a content of the solvent after the secondary drying is 0.0001 part by weight to 0.1 part by weight based on 100 parts by weight of the color conversion layer.

7. The method of claim 6, wherein the coating of the resin solution onto the base film is performed by a roll-to-roll process.

8. The method of claim 6, wherein the primary drying is performed at 100° C. to 200° C. for 15 minutes or less.

9. The method of claim 6, wherein the secondary drying of the resin solution is performed at 130° C. to 200° C. for 25 minutes or less.

10. A backlight unit comprising the color conversion film according to claim 1.

11. A display device comprising the backlight unit according to claim 10.

12. The color conversion film of claim 1, wherein the base film has a thickness of 1 μm to 100 μm.

13. The color conversion film of claim 1, wherein the color conversion film has a thickness of 2 μm to 200 μm.

14. The color conversion film of claim 1, wherein a content of the organic fluorescent dye is 0.005 part by weight to 2 parts by weight based on 100 parts by weight of a thermoplastic resin.

* * * * *